Patented July 15, 1930

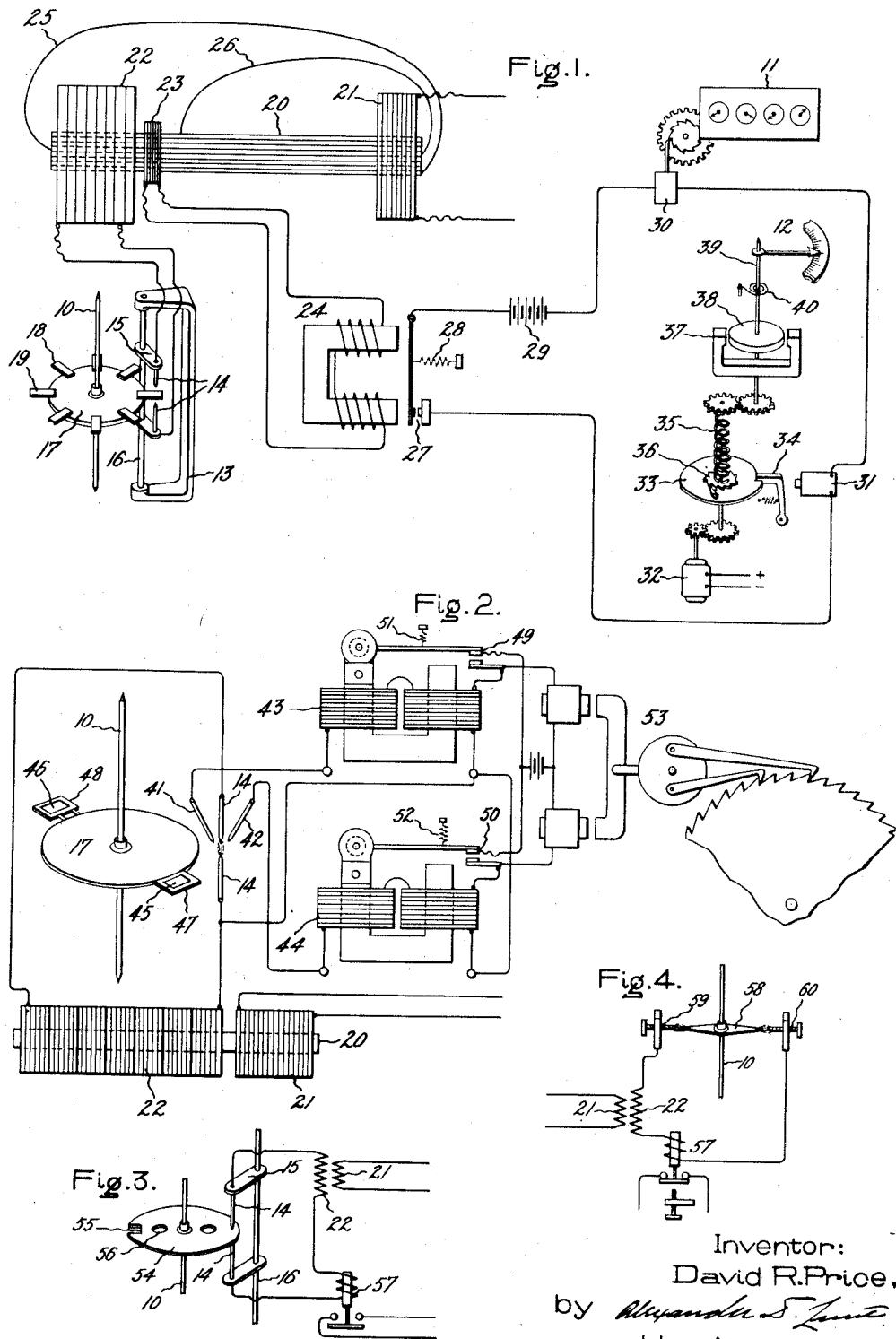

1,770,804

UNITED STATES PATENT OFFICE

DAVID R. PRICE, OF LYNN, MASSACHUSETTS, ASSIGNOR TO GENERAL ELECTRIC COMPANY, A CORPORATION OF NEW YORK

FRICTIONLESS COMMUTATING MECHANISM

Application filed August 8, 1927. Serial No. 211,605.

My invention relates broadly to a method of and apparatus for commutating electric currents without friction. More specifically my invention relates to a method and apparatus for producing electric impulses without friction. Although not limited thereto, the invention is particularly advantageous in connection with the transmission of electrical impulses from measuring devices such as electric meters and instruments where it is very important from the standpoint of measurement accuracy that any contact making mechanism associated with and operated by the measuring device shall not impose any appreciable friction upon the turning movement of the device.

The common method of transmitting electric impulses from rotating meters is to provide some sort of a mechanical contact switch operated by the meter. This sort of arrangement naturally imposes a certain amount of load on the meter tending to interfere with its accuracy of measurement and imposing various limitations upon its use.

My invention has for its primary object the provision of a dependable frictionless contact device for this class of work. In carrying my invention into effect I provide apparatus for producing a spark discharge adjacent to some movable part of the meter or instrument and cause the movable measuring element to interrupt or change the path of the spark discharge to produce the desired commutating result without the use of direct mechanical contacts. The invention may be carried out in many different ways and for a variety of purposes and in the following description several embodiments of the invention represented in Figs. 1 and 4 inclusive, which I have found to operate satisfactorily, will be explained.

The features of the invention which are believed to be novel and patentable will be pointed out in the claims appended hereto.

In Fig. 1 I have represented a telemetering system in which the problem involved is to transmit the rotations of a meter shaft 10 to a counting register at 11 and a speed indicator at 12. My invention is here employed in connection with the transmitting meter to produce signalling impulses proportional to the meter speed. These impulses are then sent over suitable circuits to the receiving devices. In the form of the invention here represented 13 is a suitable supporting frame for the two electrodes 14 of a spark gap. These electrodes are spaced apart and held by insulated parts 15 from a rod 16. This spark gap is positioned adjacent the meter shaft 10 and the shaft is provided with a disc 17 which carries about its periphery a number of commutating devices 18 and 19 which are adapted, as the shaft rotates, to pass between the electrodes 14 without contacting therewith. These commutating devices may be strips of mica or other insulating material cemented or otherwise secured to the supporting disc 17. To produce the necessary voltage to break down the gap between the electrodes 14 I provide in this instance a transformer of special construction consisting of an open core member 20, a low tension primary winding 21, and a high tension secondary winding 22 having a large number of turns as compared with the winding 21. The primary winding 21 may be connected to a 110 volt A. C. lighting circuit. The secondary winding 22 is preferably made up of a number of pancake sections which are stacked together and connected in series to increase the insulation. This coil may produce an open circuit voltage of say 10,000 volts. The transformer is an open core transformer with high leakage and is provided with a low voltage secondary coil 23 connected to a relay 24. The high voltage coil 22 is connected across the sparking electrodes 14. The electrodes are adjusted apart the proper distance to produce a low current arc across the gap when no insulating member 18 or 19 is located between them. This distance may be from $\frac{1}{32}$ to $\frac{1}{16}$ inches and is not at all critical. When one of the members 18 or 19 is rotated through the spark gap it momentarily interrupts this current.

The operation of the transmitter may be described as follows: When one of the commutating insulating strips 18 or 19 is positioned in the spark gap and the transformer is energized the high voltage coil 22 is open circuited and the flux of the transformer core traverses the general path indicated by line 25. The secondary coil 23 is consequently quite strongly influenced and a current flows in its circuit sufficient to operate relay 24 and open the contacts indicated at 27. Rotation of the meter shaft 10 and disc 17 will now move the members 18 and 19 through the spark gap so that the high voltage circuit formed by coil 22, the electrodes 14 and the intermediate gap is intermittently made and broken at the spark gap. When it is made by reason of the absence of one of the insulating commutating members between the electrodes the current in coil 22 opposes the flux produced by the primary coil 21 and the flux to a large extent is compelled to take the path indicated by line 26. The result is a great drop of voltage in coil 23 and the relay armature is pulled back by a spring 28 to close contacts 27. Thus the relay 24 is operated for every interruption of the arc between the electrodes 14 and this interruption is made by an entirely frictionless commutating device so that no load whatever is imposed upon the meter shaft 10 because of this commutating function. The reaction of the magnetic field of the open core transformer also limits the current through the spark gap by the well known constant current transformer action. The voltage of coil 22 varies inversely with the current therein. In practice this is of the greatest importance because it makes the transformer entirely safe against person injury due to accidental contact with the terminals. This safety feature is inherent in the transformer and does not depend upon added resistance or limiting means which in themselves might become inoperative. By so limiting the current the sparking terminals between the electrodes 14 are permanent, that is to say, they are not burnt away in the least by continuous use. I have found that it is entirely practicable to limit this current in this way to a fraction of a miliampere and obtain dependable operating of the relay 24.

It will be noted that the commutating devices 19 which are diametrically located are somewhat longer than the remaining devices 18. By swinging the electrodes 14 away from the disc slightly the devices 18 will not interrupt the arc but the devices 19 will. By this simple expedient the number of impulses per revolution of the shaft 10 may be easily changed to meet various requirements. The speed of operation of the transmitting device is limited only by the inertia of relay 24 and I have found that as high as 40 operations per second can be obtained in an entirely reliable manner without imposing any friction or design limitations upon the meter shaft 10. The number of commutating members about disc 17 may obviously be anything desired and may easily be changed. The direction of rotation of shaft 10 is obviously immaterial. Thus, many of the limitations of the mechanical contact devices of the prior art are eliminated by my invention.

The contacts at 27 control a telemetric impulse circuit containing a source of supply 29, an ordinary ratcheting relay 30 for operating the counting register 11 and a relay 31 for releasing an escapement device and thus controlling the indicating device 12. This indicating device is operated by a mechanism for converting intermittent impulses received by relay 31 into a deflection proportional to the average rate of such impulses. A constantly energized electric motor 32 drives a disc 33. This disc has a notch in its periphery adapted to be energized by a latch 34 operated by relay 31. When an impulse is received the latch 34 is withdrawn momentarily and the disc 33 makes one revolution by which time the latch is released by the relay and stops the disc. Thus, disc 33 makes one revolution for each impulse received. The disc drives a spring shaft 35 through a pawl and ratchet device 36 and this spring shaft drives one member 37 of a magnetic torque device consisting of a permanent magnet 37 and an induction disc 38. The induction disc 38 is secured to a shaft 39 carrying the pointer of the indicator 12 and restrained by a spring 40. The torque between members 37 and 38 is proportional to the average speed of rotation of member 37 and a corresponding deflection at 12 is produced. Thus, the intermittent impulses are smoothed out and modified to produce a deflection proportional to the average rate of such impulses so that the indicator 12 may be calibrated to indicate the average speed of rotation of the meter shaft 10 or calibrated to indicate watts or amperes, or any other quantity which the meter shaft 10 is arranged to integrate.

Fig. 2 represents another embodiment of the invention which is designed to produce alternate impulses in different circuits and is thus suitable for that class of telemetric systems where polarized relays or double relay receivers designed to be alternately actuated are employed.

The transformer of Fig. 2 is in general similar to that described in connection with Fig. 1 with the exception that the low voltage secondary coil 23 of Fig. 1 is omitted. The vertically arranged electrodes 14 are similar to those of Fig. 1 and are connected directly across the high voltage coil 22 of the transformer so that normally the arc represented in Fig. 2 takes place between them. The lower electrode 14 is connected in parallel with additional electrodes 41 and 42 placed adjacent to and on opposite sides of the upper electrode 14. Relays 43 and 44 are connected in series with electrodes 41 and 42 respectively. It is now seen that the discharge of the high voltage coil 22 may occur through one of three possible paths; first, the path indicated between electrodes 14; second, through relay 43 and electrode 41 and the upper electrode 14; and third, through relay 44, electrode 42 and the upper electrode 14. Normally it will be arranged to occur between electrodes 14 as represented.

A commutating device 45 is provided on the periphery of the meter driven disc 17 to shift the arc discharge to the path between the upper electrode 14 and electrode 41 when member 45 is rotated between the electrodes 14, and another commutating device 46 on the opposite side of disc 17 is provided to shift the discharge arc to the path between the upper electrode 14 and electrode 42 when member 46 is rotated between the electrodes 14. This is easily accomplished by the proper spacing and arrangement of the electrodes and the commutating devices as follows: If the discharge point of the upper electrode 14 is equally spaced from the discharge points of the parallel connected electrodes and neither of the commutating devices are near, the discharge arc will occur between the vertically arranged electrodes 14. This is partially because of the ease with which an arc follows a vertical path as compared to a horizontal path due to the heated air currents and partially due to the horn gap blowout effect produced upon a horizontal arc. The exact spacing of the electrodes is not at all critical. The operating conditions may also be influenced by altering the relative sharpness of the discharge points of the electrodes, by altering the mass of the electrodes so as to vary their cooling effect on the arc and by magnetic blowout effects.

The members 45 and 46 are small segments of aluminum or other suitable conducting material cemented onto slightly larger insulating pieces 47 and 48 which may be of mica. Commutating member 45 is radially positioned with respect to shaft 10 so that when rotated adjacent the electrodes it passes close to but out of contact with the upper electrode 14 and electrode 41. The mica support first interrupts the arc between the electrodes 14 and the metallic part 45 then induces the arc to establish itself between the upper electrode 14 and electrode 41. As soon as this commutating device is moved from between the electrodes 14 the arc is re-established between them. The commutating device comprising parts 46 and 48 is positioned at a slightly greater distance from shaft 10 so that when rotated past the electrodes the plate 46 passes adjacent to the upper electrode 14 and the outer electrode 42. It functions in the same way as the other commutating member except that it momentarily establishes the arc between the upper electrode 14 and the outer electrode 42. The relays 43 and 44 are thus alternately energized and deenergized as the shaft 10 rotates in a given direction, the current from coil 22 of the transformer passing first through electrodes 14, then through the upper electrode 14, electrode 41 and relay 43, next through the electrodes 14 again, next through the upper electrode 14, electrode 42 and relay 44, and then again through the electrodes 14, completing the cycle of operation for one rotation of shaft 10. If electrode 42 were omitted from this device the commutating element could consist of a simple piece of mica such as the part 47 and would serve merely to interrupt the arc between the vertical electrodes 14. When thus interrupted the arc would re-establish itself between the upper electrode 14 and electrode 41.

Relays 43 and 44 close contacts 49 and 50 alternately as the relays are alternately energized. The relay contacts are opened as soon as the relays are deenergized, for example by means of suitable springs represented at 51 and 52.

The contacts controlled by these relays may be arranged to produce current impulses of opposite polarity in a polarized relay telemetric system, or they may otherwise control the separate relays of a double relay ratchet mechanism 53 for operating a counter as represented. The commutating device of this figure is frictionless in its operation, the shaft 10 may turn in either direction and additional sets of commutating devices may be added as desired. The open core type of transformer supplies ample operating voltage but limits the operating current to safe limits in the manner described above in connection with Fig. 1.

In Fig. 3 I have represented another form of the invention in which the commutating device is a disc 54 of insulating material provided with cutaway portions 55 and 56 which when rotated between the electrodes 14 allows the arc current to flow only when such openings are adjacent the electrodes. The device represented is arranged to produce one or two impulses per revolution depending upon whether the electrodes are set on the radius of opening 55, or openings 56. The transformer which is represented merely by coils is preferably of the open core type already described. This device is arranged to operate a relay 57 upon the occurrence of an impulse.

Fig. 4 is another arrangement in which the commutating device comprises a conducting member 58 adapted to establish the impulse arc between electrodes 59 and 60 twice per revolution of the shaft 10. As shown, the commutating member is in position to establish the arc which in this case is divided into two portions on opposite ends of the part 58. If desired, the conducting member 58 may be insulated from the shaft.

In accordance with the provisions of the patent statutes, I have described the principles of operation of my invention, together with the apparatus which I now consider to represent the best embodiment thereof; but I desire to have it understood that the apparatus shown is only illustrative and that the invention may be carried out by other means.

What I claim as new and desire to secure by Letters Patent of the United States, is:

1. Apparatus for producing current impulses in response to the rotation of meter elements and the like without imposing friction upon such elements comprising in combination with such a rotating element, spaced electrodes forming a discharge gap located adjacent to such element, an electric circuit connected across said electrodes, a high leakage transformer for energizing said circuit and normally producing a low current discharge across said gap, and an insulating member on said rotary element adapted to be moved through said discharge gap by the rotation of said element without making contact with said electrodes and to intermittently interrupt said discharge current between said electrodes.

2. Apparatus for transmitting current impulses in response to a rotary device without imposing frictional load upon said device comprising in combination with a rotary member of such device, an electric circuit containing spaced electrodes located adjacent to said rotary member and forming a plurality of discharge gaps connected in parallel in said circuit, means for producing a high voltage low current in said circuit and a plurality of devices carried by said rotary member adapted to be moved adjacent said discharge gaps and to produce different effects upon the discharge current thereof without making contact with said electrodes.

3. Apparatus for producing current impulses in response to a rotary element without imposing friction thereon, comprising a rotary element provided with a plurality of devices located at different positions on said element, an electric circuit containing spaced electrodes connected in parallel and forming parallel connected discharge gaps in said circuit, means for producing a high voltage low current in said circuit, said parallel connected gaps being located adjacent the paths of movements of said plurality of devices, such that different devices cause the discharge current to occur across different discharge gaps as said rotary element is rotated in a given direction.

4. Apparatus for producing two groups of alternately occurring current impulses in response to the continuous rotation of a rotary member without imposing friction upon said rotating member, comprising, in combination with such a rotary member having a pair of devices projecting in different radial directions and different distances from a point in the axis of rotation of said rotary member, a plurality of electrodes located adjacent to the path of movement of said devices, said electrodes being positioned and connected to form parallel connected spark gaps located at slightly different radial distances from the axis of rotation of said rotary member, and means for energizing said electrodes with a voltage sufficient to produce an arc discharge across any set of the parallel connected electrodes, said devices serving when rotated past said electrodes in a given direction to cause the discharge to be alternately shifted to a different set of said electrodes.

5. In combination an integrating meter together with apparatus for producing signalling current impulses proportional to the integrating rate of said meter comprising stationary spaced electrodes forming a spark gap positioned adjacent to a rotating part of said meter, a source of supply connected to said electrodes for normally producing a continuous discharge current between said electrodes, means carried by the rotating part of said meter for momentarily interrupting the discharge current between said electrodes as said means is rotated past said electrodes, and a relay circuit including another spark gap connected in parallel to the first mentioned gap.

6. Apparatus for producing signalling current impulses in response to the rotation of the meter element comprising in combination with such an element a plurality of spark gaps located adjacent the path of rotation of the meter element, a source of supply, branch circuits connecting said spark gap in parallel to said source of supply, said source being capable of producing a continuous discharge across any one of said parallel connected gaps, and means carried by the meter element and adapted to be rotated past said spark gaps for shifting said discharge from one gap to another.

7. Apparatus for producing signalling current impulses in response to the rotation of the meter element comprising in combination with such an element a plurality of spark gaps arranged for different effective resistances to the passage of a discharge current, the gap having the least effective resistance being located adjacent the path of rotation of the meter element, a source of supply, branch circuits connecting said spark gaps in parallel to said source of supply, said source being capable of producing a continuous electric discharge across any one of said parallel connected gaps, and means carried by the meter element which when rotated past the adjacent gap interrupts the discharge thereacross.

In witness whereof, I have hereunto set my hand this 4th day of August, 1927.

DAVID R. PRICE.